United States Patent
Wang et al.

(10) Patent No.: US 12,331,190 B2
(45) Date of Patent: Jun. 17, 2025

(54) POLYCARBONATE-BASED THERMOPLASTIC COMPOSITIONS HAVING IMPROVED TRANSPARENCY PROPERTIES

(71) Applicant: SHPP GLOBAL TECHNOLOGIES B.V., Bergen op Zoom (NL)

(72) Inventors: Qin Wang, Shanghai (CN); Jian Yang, Shanghai (CN); Xingqiu Wan, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/727,355

(22) PCT Filed: Jan. 9, 2023

(86) PCT No.: PCT/IB2023/050157
§ 371 (c)(1),
(2) Date: Jul. 9, 2024

(87) PCT Pub. No.: WO2023/131918
PCT Pub. Date: Jul. 13, 2023

(65) Prior Publication Data
US 2024/0425700 A1    Dec. 26, 2024

(30) Foreign Application Priority Data

Jan. 10, 2022 (EP) .................... 22150758

(51) Int. Cl.
*C08L 69/00* (2006.01)
*C08K 5/103* (2006.01)
*C08K 5/524* (2006.01)

(52) U.S. Cl.
CPC ............ *C08L 69/00* (2013.01); *C08K 5/103* (2013.01); *C08K 5/524* (2013.01); *C08L 2201/10* (2013.01); *C08L 2205/02* (2013.01); *C08L 2205/06* (2013.01)

(58) Field of Classification Search
CPC ....... C08L 69/00; C08L 2205/06; C08K 5/09; C08K 5/524
See application file for complete search history.

(56) References Cited

U.S. PATENT DOCUMENTS

| | | | |
|---|---|---|---|
| 5,852,158 A | 12/1998 | De Bont et al. | |
| 6,008,280 A | 12/1999 | Krishnan et al. | |
| 7,241,825 B2 | 7/2007 | Koga et al. | |
| 2007/0228587 A1 | 10/2007 | Ikari | |
| 2012/0095139 A1* | 4/2012 | Yoshida | C08K 5/13 524/91 |
| 2013/0317143 A1* | 11/2013 | Daga | C08K 7/02 524/116 |
| 2018/0236142 A1* | 8/2018 | Sun | B29C 33/60 |

FOREIGN PATENT DOCUMENTS

| | | |
|---|---|---|
| DE | 10 2007 043755 A | 3/2009 |
| EP | 2716712 A1 | 4/2014 |
| JP | 2004-137471 A | 5/2004 |
| WO | 2005/121247 A1 | 12/2005 |
| WO | 2017/040513 A1 | 3/2017 |
| WO | 2022/130211 A1 | 6/2022 |

OTHER PUBLICATIONS

Palmitic acid article of Wikipedia of Dec. 12, 2020 captured by the Wayback Machine (Year: 2020).*
International Search Report and Written Opinion mailed Jul. 13, 2023 in PCT/IB2023/050157 (12 pgs.).

* cited by examiner

*Primary Examiner* — Mark S Kaucher
(74) *Attorney, Agent, or Firm* — Quicker Law, LLC

(57) ABSTRACT

A thermoplastic composition includes: a transparent thermoplastic resin; from about 0.1 wt % to about 2 wt % of a mold release agent including pentaerythritol tetrastearate (PETS); and from 0.01 wt % to about 5 wt % of a stabilizer component. The PETS is derived from an aliphatic carboxylic acid having less than 50 wt % content of C18 or longer alkane chains. The thermoplastic composition has improved transparency properties as compared to comparative compositions including PETS derived from an animal source.

11 Claims, 1 Drawing Sheet

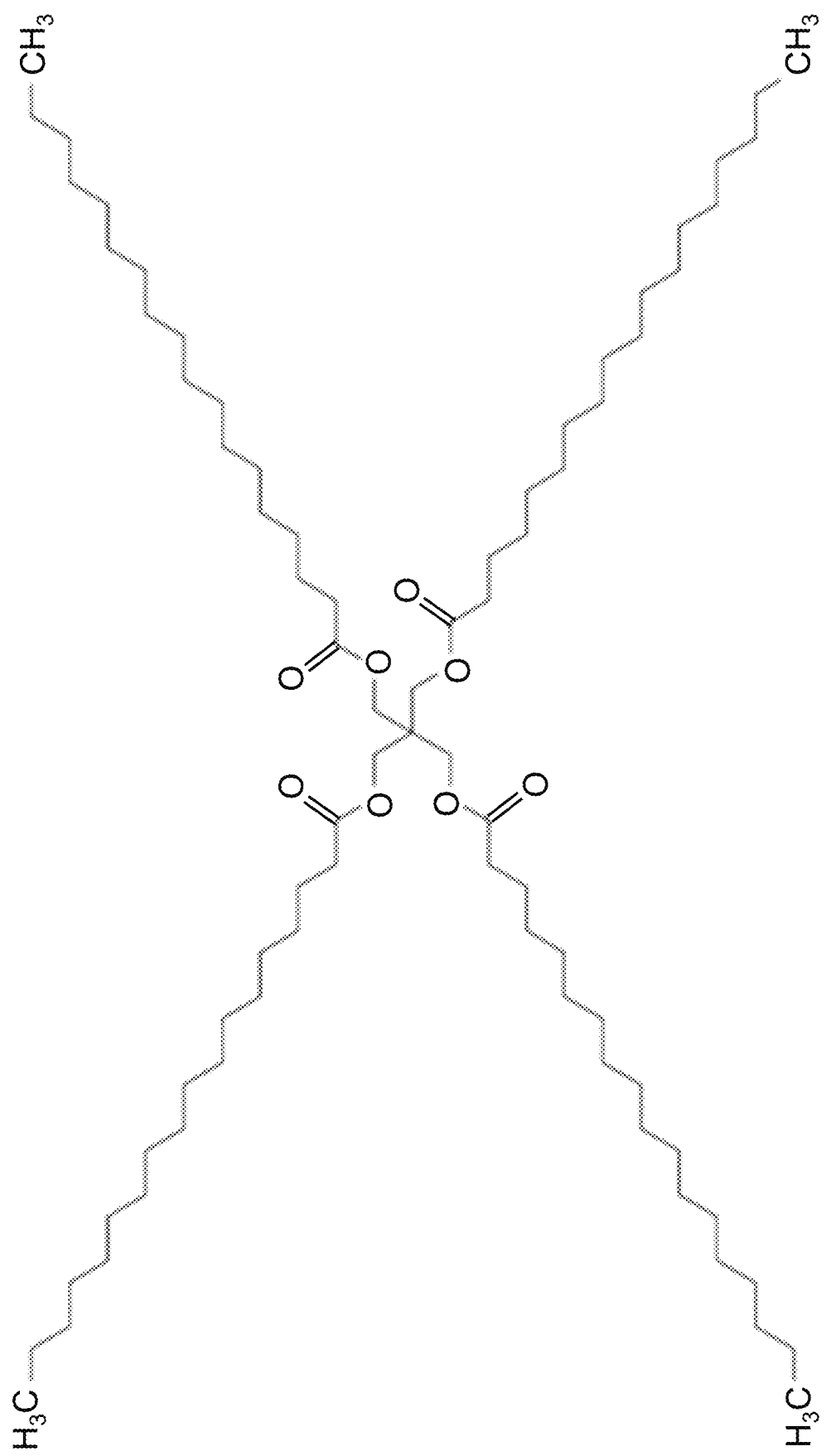

POLYCARBONATE-BASED THERMOPLASTIC COMPOSITIONS HAVING IMPROVED TRANSPARENCY PROPERTIES

CROSS-REFERENCE TO RELATED APPLICATION

This application is the National Stage of International Application No. PCT/IB2023/050157 filed Jan. 9, 2023, which claims priority to and the benefit of European Application No. 22150758.5 filed Jan. 10, 2022, the disclosures of which are incorporated herein by this reference in their entireties.

FIELD OF THE DISCLOSURE

The present disclosure relates to polycarbonate-based thermoplastic resins having improved transparency properties, and in particular to polycarbonate-based thermoplastic resins including a pentaerythritol tetrastearate (PETS) component derived from an aliphatic carboxylic acid having less than 50 wt % content of C18 or longer alkane chains.

BACKGROUND OF THE DISCLOSURE

Polycarbonate (PC) resin is known to have excellent impact resistance, heat resistance and transparency. As a result it is widely used in transparent applications such as lenses, window glass, automobile components and lamp covers. In molding applications a release agent is added to the polycarbonate resin to improve mold release properties. Conventional mold release agents include fatty acid esters, polyolefin-based wax, fluorine oil, and paraffin wax. Fatty acid esters are widely used as release agents. Compared with glycerin monostearate, compositions including pentaerythritol tetrastearate (PETS) as a release agent are found to have good transparency, weatherability and hydrolysis resistance without substantially affecting impact resistance and heat resistance. As a result, PETS is widely used in PC compounds.

Conventional PETS compounds, however, can cause increased haze in polycarbonate resin due to phase compatibility issues. High haze is not desired in optical applications. Accordingly, there is a need for mold release agents that provide improved optical performance in thermoplastic compositions.

These and other shortcomings are addressed by aspects of the disclosure.

SUMMARY

Aspects of the disclosure relate to a thermoplastic composition including: a transparent thermoplastic resin; from about 0.1 wt % to about 2 wt % of a mold release agent including pentaerythritol tetrastearate (PETS); and from 0.01 wt % to about 5 wt % of a stabilizer component. The PETS is derived from an aliphatic carboxylic acid having less than 50 wt % content of C18 or longer alkane chains. The thermoplastic composition has improved transparency properties as compared to comparative compositions including PETS derived from an animal source.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIG. 1 shows the chemical structure of pentaerythritol tetrastearate (PETS).

DETAILED DESCRIPTION

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a transparent thermoplastic resin" includes mixtures of two or more transparent thermoplastic resins.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "$M_w$" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g., polycarbonate polymers, by methods well known to a person having ordinary skill in the art using molecular weight standards, e.g., polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

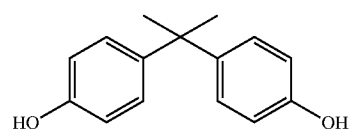 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl) propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co) polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to a thermoplastic composition including: a transparent thermoplastic resin; from about 0.1 wt % to about 2 wt % of a mold release agent including pentaerythritol tetrastearate (PETS); and from 0.01 wt % to about 5 wt % of a stabilizer component. The PETS is derived from an aliphatic carboxylic acid having less than 50 wt % content of C18 or longer alkane chains. The combined weight percent value of all components does not exceed 100 wt %, and all weight percent values are based on the total weight of the composition.

Pentaerythritol tetrastearate (PETS) is produced by an esterification reaction between pentaerythritol and aliphatic carboxylic acid. It has the chemical structure shown in FIG. 1.

The aliphatic carboxylic acid used to make conventional PETS is extracted from tallow oil, which is rendered animal fat. Due to the basic content of tallow oil the fatty oil has a higher content of stearic acid (C18) than palmitic acid (C16). The longer alkane chain induces phase separation, which increases haze. In contrast, PETS sourced from vegetable-based oils (such as but not limited to castor oil) has more palmitic acid than stearic acid. As a result, vegetable-based PETS has a lower alkane chain length. Compositions according to aspects of the disclosure including vegetable-based PETS were surprisingly found to have lower haze and improved transmittance properties.

Accordingly, in some aspects the PETS is derived from an aliphatic carboxylic acid having less than 50 wt % content of C18 or longer alkane chains. In certain aspects the PETS is derived from an aliphatic carboxylic acid having from 5 wt % to less than 50 wt %, or from 10 wt % to less than 50 wt %, or from 15 wt % to less than 50 wt %, or from 20 wt % to less than 50 wt %, or from 25 wt % to less than 50 wt %, or from 30 wt % to less than 50 wt %, or from 35 wt % to less than 50 wt %, or from 5 wt % to 49 wt %, or from or from 5 wt % to 48 wt %, or from 5 wt % to 47 wt %, or from 5 wt % to 46 wt %, or from 5 wt % to 45 wt %, or from 5 wt % to 44 wt %, or from 5 wt % to 43 wt %, or from 5 wt % to 42 wt %, or from 5 wt % to 41 wt %, or from 5 wt % to 40 wt % content of C18 or longer alkane chains. In particular aspects the PETS is derived from a plant or vegetable source. In specific aspects the PETS is not derived from an animal source.

The transparent thermoplastic resin includes in some aspects a polycarbonate homopolymer, a polycarbonate copolymer, or a combination thereof. An exemplary polycarbonate homopolymer is bisphenol-A (BPA) polycarbonate. An exemplary polycarbonate copolymer includes sebacic acid monomer units and bisphenol-A monomer units. Sebacic acid has the following structure:

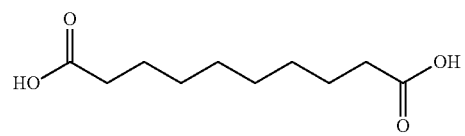

Bisphenol-A has the structure:

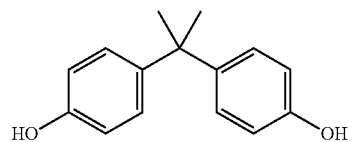 [SMILES: CC(C)(c1ccc(O)cc1)c1ccc(O)cc1]

As a copolymer, the sebacic acid monomer provides the copolymer with good flow and ductility properties at a lower processing temperature, while the BPA monomer provides improved heat and modulus properties.

In yet further aspects the polycarbonate copolymer includes a sebacic acid/BPA/p-cumyl-phenol (PCP) polyestercarbonate.

Exemplary sebacic acid/BPA and sebacic acid/BPA/PCP polyestercarbonate copolymers include high molecular weight (Mw) high flow/ductile (HFD) polycarbonates, low Mw HFD polycarbonates, or a combination thereof. Suitable polycarbonate homopolymers and copolymers are available from SABIC.

In certain aspects the polycarbonate copolymer includes an isophthalate-terephthalate-resorcinol (ITR)-polycarbonate copolymer. An ITR-polycarbonate (PC) copolymer has the following chemical structure:

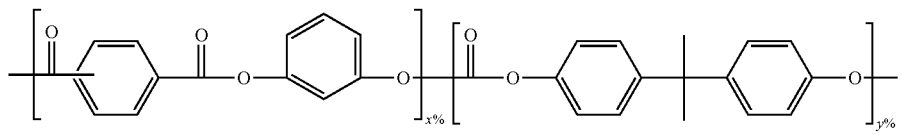

In this general structure, x and y can vary from 10 wt % to 90 wt %. For example, SLX20/80 identifies the copolymer as having x=20 wt % (the isophthalic acid, terephthalic acid, and resorcinol (ITR) block) and y=80 wt % (the polycarbonate (PC) block). SLX90/10 identifies the copolymer has having x=90 wt % and y=10 wt %. In some aspects the ITR-PC copolymer includes from 75-90 wt % ITR blocks and from 10-25 wt % PC blocks. In particular aspects the ITR-PC copolymer includes from 80-84 wt % ITR blocks and from 16-20 wt % PC blocks, or in specific aspects about 82 wt % ITR blocks and about 18 wt % PC blocks. In further aspects the ITR-PC copolymer includes from 10-30 wt % ITR blocks and from 70-90 wt % PC blocks. In yet further aspects the ITR-PC copolymer includes from 15-25 wt % ITR blocks and from 75-85 wt % PC blocks, or from 18-22 wt % ITR blocks and from 78-82 wt % PC blocks, or about 20 wt % ITR blocks and about 80 wt % PC blocks.

In further aspects the thermoplastic resin includes a poly (carbonate-siloxane copolymer). The PC—Si copolymer can have a siloxane content of from about 5 to 45 wt % based on the total weight of the poly (carbonate-siloxane). In other aspects the PC—Si copolymer has a siloxane content of from about 5 wt % to about 25 wt %, from about 5 wt % to about 20 wt %, from about 5 wt % to about 10 wt %, or from about 15 wt % to about 25 wt %. The thermoplastic composition may have a plurality (e.g., 2 or more) PC—Si copolymers, each of the PC—Si copolymers having a siloxane content of from about 5 to 45 wt % based on the total weight of the poly (carbonate-siloxane). Each of the plurality of PC—Si copolymers may independently have a siloxane within one of the ranges set forth above, e.g., a first PC—Si copolymer having a siloxane content of from about 5 wt % to about 10 wt % and a second PC—Si copolymer having a siloxane content of from about 15 wt % to about 25 wt %. As used herein, "siloxane content" of the poly (carbonate-siloxane) means the content of siloxane units based on the total weight of the poly (carbonate-siloxane). Exemplary PC—Si copolymers include LEXAN™ EXL resins available from SABIC, including EXL resin having a siloxane content of 20 wt % (opaque EXL) and EXL resin having a siloxane content of 6 wt % (transparent EXL).

The stabilizer component includes in some aspects a thermal stabilizer, a hydro stabilizer, a UV stabilizer, or a combination thereof. An exemplary hydro stabilizer is Joncryl ADR 4368CS, available from BASF. Phosphite compounds are also suitable stabilizer components.

In some aspects the composition further includes at least one additional additive. The at least one additional additive may include, but is not limited to, an acid scavenger, an anti-drip agent, an antioxidant, an antistatic agent, a chain extender, a colorant, a flow promoter, a lubricant, a plasticizer, a quenching agent, a flame retardant, a UV reflecting additive, an impact modifier, a blowing agent, a reinforcing agent, or a combination thereof.

In certain aspects the composition includes from greater than 0 wt % to about 5 wt % of at the least one additional additive.

In particular aspects the at least one additional additive is a reinforcing agent including glass fiber, and the composition includes from greater than 0 wt % to about 10 wt % of the reinforcing agent.

The thermoplastic composition according to aspects of the disclosure has improved properties as compared to conventional compositions including PETS derived from an animal source. In specific aspects the composition has a haze of less than 3.5% as tested in accordance with ASTM D2244 with a 10° observer and a D65 illuminant. In further aspects the composition has a haze that is at least 15% lower than that of a comparative composition that includes PETS derived from an animal source instead of the PETS is derived from an aliphatic carboxylic acid having less than 50 wt % content of C18 or longer alkane chains.

In certain aspects the composition has a notched Izod impact strength (NII) that is at least 15% higher than that of a comparative composition that includes PETS derived from an animal source instead of the PETS is derived from an aliphatic carboxylic acid having less than 50 wt % content of C18 or longer alkane chains, wherein NII is determined according to ASTM D256 and ASTM D4812 at 23° C. with a pendulum energy of 5 pound-force per foot (Ibf/ft).

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

In specific aspects the article includes one or more of a lens, window, automobile headlight cover, and lamp cover.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:
a transparent thermoplastic resin;
from about 0.1 wt % to about 2 wt % of a mold release agent comprising pentaerythritol tetrastearate (PETS); and
from 0.01 wt % to about 5 wt % of a stabilizer component, wherein the PETS is derived from an aliphatic carboxylic acid having less than 50 wt % content of C18 or longer alkane chains, and
wherein the combined weight percent value of all components does not exceed 100 wt %, and all weight percent values are based on the total weight of the composition.

Aspect 2. The thermoplastic composition according to Aspect 1, wherein the PETS is derived from a plant or vegetable source.

Aspect 3. The thermoplastic composition according to Aspect 1 or 2, wherein the transparent thermoplastic resin comprises polycarbonate homopolymer, polycarbonate copolymer, or a combination thereof.

Aspect 4. The thermoplastic composition according to Aspect 3, wherein the composition comprises a polycarbonate copolymer comprising a polyester-polycarbonate copolymer, an isophthalate-terephthalate-resorcinol (ITR)-polycarbonate copolymer, a polycarbonate-siloxane copolymer, or a combination thereof.

Aspect 5. The thermoplastic composition according to Aspect 4, wherein the composition comprises an ITR-polycarbonate copolymer comprising from 10-90 wt % ITR blocks and from 10-90 wt % polycarbonate blocks.

Aspect 6. The thermoplastic composition according to any of Aspects 1 to 5, wherein the stabilizer component comprises a thermal stabilizer, a hydro stabilizer, a UV stabilizer, or a combination thereof.

Aspect 7. The thermoplastic composition according to any of Aspects 1 to 6, wherein the composition further comprises at least one additional additive.

Aspect 8. The thermoplastic composition according to Aspect 7, wherein the at least one additional additive comprises an acid scavenger, an anti-drip agent, an antioxidant, an antistatic agent, a chain extender, a colorant, a flow promoter, a lubricant, a plasticizer, a quenching agent, a flame retardant, a UV reflecting additive, an impact modifier, a blowing agent, a reinforcing agent, or a combination thereof.

Aspect 9. The thermoplastic composition according to Aspect 7 or 8, wherein the composition comprises from greater than 0 wt % to about 5 wt % of at the least one additional additive.

Aspect 10. The thermoplastic composition according to Aspect 7 or 8, wherein the composition comprises from greater than 0 wt % to about 10 wt % of a reinforcing agent comprising glass fiber.

Aspect 11. The thermoplastic composition according to any of Aspects 1 to 10, wherein the composition has a haze of less than 3.5% as tested in accordance with ASTM D2244 with a 10° observer and a D65 illuminant.

Aspect 12. The thermoplastic composition according to any of Aspects 1 to 11, wherein the composition has a haze that is at least 15% lower than that of a comparative composition that includes PETS derived from an animal source instead of the PETS is derived from an aliphatic carboxylic acid having less than 50 wt % content of C18 or longer alkane chains.

Aspect 13. The thermoplastic composition according to any of Aspects 1 to 12, wherein the composition has a notched Izod impact strength (NII) that is at least 15% higher than that of a comparative composition that includes PETS derived from an animal source instead of the PETS is derived from an aliphatic carboxylic acid having less than 50 wt % content of C18 or longer alkane chains, wherein NII is determined according to ASTM D256 and ASTM D4812 at 23° C. with a pendulum energy of 5 pound-force per foot (lbf/ft).

Aspect 14. An article comprising the thermoplastic composition according to any of Aspects 1 to 13.

Aspect 15. The article according to Aspect 14, wherein the article comprises one or more of a lens, window, automobile headlight cover, and lamp cover.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Components used in the comparative and example compositions described herein are shown in Table 1:

TABLE 1

Components

| Item Description | Chemical Description | Source |
|---|---|---|
| 100 GRADE PCP | PC | SABIC |
| PCP1300 | PC | SABIC |
| Sebacic Acid/BPA copolymer | HFD PC | SABIC |
| Sebacic acid/BPA/PCP polyestercarbonate | HFD PC | SABIC |
| Joncryl ADR 4368CS | Stabilizer | BASF |
| Phosphite stabilizer, Tris(2,4-di-t-butylphenyl) phosphite | Stabilizer (Antioxidant) | BASF |
| PETS (animal source-based) | PETS (Conventional) | FACI |
| PETS (vegetable source-based) | V-PETS-1 | FACI |
| PETS (vegetable source-based) | V-PETS-2 | Emery |
| PETS (vegetable source-based) | V-PETS-3 | Riken |

PC pellets were compounded from recycled PC sourced from automobile headlights and optical discs. The materials were fed separately into the throat. All additives were pre-mixed with virgin PC and fed from the main throat using another feeder. Molding conditions used to form the samples are shown in Table 2:

TABLE 2

Injection Molding Conditions

| Molding parameters | unit | Value |
|---|---|---|
| Pre-drying time | Hour | 4 |
| Pre-drying temp | ° C. | 120 |
| Hopper temp | ° C. | 50 |
| Zone 1 temp | ° C. | 270 |
| Zone 2 temp | ° C. | 270 |
| Zone 3 temp | ° C. | 270 |
| Nozzle temp | ° C. | 270 |
| Mold temp | ° C. | 100 |

Mechanical tests were performed according to the following standards:

Notched Izod Impact Strength was tested according to ASTM D256 and ASTM D4812 at room temperature (23° C.) using a pendulum energy 5 pound-force per foot (lbf/ft).

Melt Volume Rate (MVR) was measured using granulate samples dried for 4 hours at 80° C. according to ASTM D1238.

Color ($L^*,a^*,b^*$), transmittance, and haze were determined according to ASTM D2244 with a 10 degree observer and D65 illuminant.

The octadecanoic acid (C18) content for each PETS compound was determined according to the following procedure. Each PETS compound was added in a sodium hydroxide (NaOH) aqueous solution and heated to 85° C. with continuous shaking overnight. Cyclohexane and tetrahydrofuran (THF) were added to dissolve the solid and form a two-layer liquid. The resulting fatty oil decomposition product was analyzed by Gas Chromatography/Mass Spectrometry (GC-MS). Results are shown in Table 3.

TABLE 3

PETS Comparison

| | PETS (conventional) | V-PETS-1 | V-PETS-2 | V-PETS-3 |
|---|---|---|---|---|
| Octadecanoic Acid (C18) content (wt %) | 70 | 39.6 | 38.9 | 46.9 |

From the results it is observed that the vegetable-based PETS compounds have a much lower C18 acid content than conventional PETS based on animal sources.

Compositions including the indicated PETS compounds were evaluated for mold-release and optical performance. The compositions and selected properties are shown in Tables 4 and 5:

TABLE 4

PC Copolymer Compositions (Natural Color)

| | C1 | Ex1 | Ex2 | Ex3 |
|---|---|---|---|---|
| Components (in wt %) | | | | |
| Sebacic Acid/BPA copolymer | 94.57 | 94.57 | 94.57 | 94.57 |
| Sebacic acid/BPA/PCP polyestercarbonate | 5 | 5 | 5 | 5 |
| PETS (conventional) | 0.27 | | | |
| V-PETS-1 (FACI) | | 0.27 | | |
| V-PETS-2 (Riketiva) | | | 0.27 | |
| V-PETS-3 (Emery) | | | | 0.27 |
| Joncryl ADR 4368CS (Stabilizer) | 0.1 | 0.1 | 0.1 | 0.1 |
| Phosphite stabilizer (Stabilizer) | 0.06 | 0.06 | 0.06 | 0.06 |
| Properties | | | | |
| Ejection Force | 1898 | 1863 | 1813 | 1931 |
| Color ($L^*a^*b^*$ scale) | | | | |
| $L^*$ | 95 | 95.3 | 94.8 | 95.2 |
| $a^*$ | −0.2 | −0.3 | −0.1 | −0.1 |
| $b^*$ | 2 | 1.7 | 2.1 | 1.7 |
| Haze (3.0 mm) | 3.7 | 2.1 | 3 | 3 |
| Transmittance (3.0 mm) | 89.9 | 90.5 | 89.3 | 90.3 |

TABLE 5

PC Copolymer Compositions (tinted)

| | C2 | Ex4 | Ex5 | Ex6 |
|---|---|---|---|---|
| Components (in wt %) | | | | |
| Sebacic Acid/BPA copolymer | 94.5776 | 94.5776 | 94.5776 | 94.5776 |
| Sebacic acid/BPA/PCP polyestercarbonate | 4.9909 | 4.9909 | 4.9909 | 4.9909 |
| PETS (conventional) | 0.27 | | | |
| V-PETS-1 (FACI) | | 0.27 | | |
| V-PETS-2 (Riketiva) | | | 0.27 | |
| V-PETS-3 (Emery) | | | | 0.27 |
| Joncryl ADR 4368CS (Stabilizer) | 0.1 | 0.1 | 0.1 | 0.1 |
| Phosphite stabilizer (Stabilizer) | 0.06 | 0.06 | 0.06 | 0.06 |
| Blue colorant | 0.0007 | 0.0007 | 0.0007 | 0.0007 |
| Red colorant | 0.0002 | 0.0002 | 0.0002 | 0.0002 |
| Carbon black | 0.0006 | 0.0006 | 0.0006 | 0.0006 |

TABLE 5-continued

PC Copolymer Compositions (tinted)

|  | C2 | Ex4 | Ex5 | Ex6 |
|---|---|---|---|---|
| Properties |  |  |  |  |
| Color (L*a*b* scale) |  |  |  |  |
| L* | 83.8 | 85.1 | 84.8 | 84.3 |
| a* | −0.4 | −0.5 | −0.4 | 0 |
| b* | −0.3 | 0.1 | −0.5 | 0.1 |
| Haze (3.0 mm) | 4.3 | 2.4 | 1.4 | 1.6 |
| Transmittance (3.0 mm) | 64.8 | 67.5 | 66.8 | 65.7 |
| MFR (300° C., 1.2 kg, 300 s) (g/10 min) | 49 | 48 | 52 | 52 |
| MFR (300° C., 1.2 kg, 1080 s) (g/10 min) | 55 | 49 | 51 | 53 |
| MVR shift | 12 | 2 | −2 | 2 |
| Notched Izod Impact Strength (J/m) | 610 | 712 | 739 | 716 |

The compositions in Table 4 were natural-colored, while the compositions in Table 5 were tinted with colorants. From the data in Table 4 it was seen that the vegetable-based PETS compositions had comparable mold-release performance as compared to those including animal-based PETS. Surprisingly, however, the vegetable-based PETS compositions had lower haze and slightly higher transmittance properties.

The transparency trends were more pronounced in the tinted compounds as shown in Table 5. The vegetable-based PETS compounds had substantially decreased haze and increased transmittance.

Additional comparative and example compositions including ITR-PC copolymer without a PC homopolymer (Table 6) and including a PC homopolymer (Table 7) were prepared and evaluated as shown:

TABLE 6

PC Copolymer Compositions

|  | Units | C3 | Ex7 | Ex8 | Ex9 |
|---|---|---|---|---|---|
| Components |  |  |  |  |  |
| SLX Resin 1 (SABIC), ITR-PC (82 wt % ITR content) | % | 99.44 | 99.44 | 99.44 | 99.44 |
| UV Stabilizer | % | 0.1 | 0.1 | 0.1 | 0.1 |
| AO Stabilizer 1 | % | 0.1 | 0.1 | 0.1 | 0.1 |
| AO Stabilizer 2 | % | 0.06 | 0.06 | 0.06 | 0.06 |
| PETS (conventional) | % | 0.3 |  |  |  |
| V-PETS-1 (FACI) | % |  | 0.3 |  |  |
| V-PETS-3 (Emery) | % |  |  | 0.3 |  |
| V-PETS-2 (Riketiva) | % |  |  |  | 0.3 |
| Properties |  |  |  |  |  |
| Haze at 1 mm | % | 1.1 | 0.4 | 0.3 | 0.4 |
| Transmittance at 1 mm | % | 89.3 | 90.1 | 90.2 | 90 |
| Haze at 2 mm | % | 2 | 0.6 | 0.6 | 0.7 |
| Transmittance at 2 mm | % | 88 | 89.4 | 89.6 | 89.1 |
| MFR, 300° C., 2.16 kg | cc/10 min | 20 | 21 | 22 | 21 |
| Flexural modulus | MPa | 2470 | 2460 | 2470 | 2500 |
| Flexural strength at break | MPa | 107 | 108 | 107 | 105 |
| HDT, 0.45 MPa, 3.2 mm | ° C. | 126 | 126 | 127 | 126 |
| HDT, 1.82 MPa, 3.2 mm | ° C. | 114 | 113 | 114 | 114 |
| Notched Izod Impact, 23° C. | J/m | 432 | 391 | 392 | 489 |

TABLE 7

PC Homopolymer/PC Copolymer Compositions with FR Additive

|  | Units | C4 | Ex10 |
|---|---|---|---|
| Components |  |  |  |
| SLX Resin 2 (SABIC), ITR-PC (20 wt % ITR content) | % | 45 | 45 |
| PC homopolymer | % | 54.32 | 54.32 |
| UV Stabilizer | % | 0.1 | 0.1 |
| AO Stabilizer 1 | % | 0.1 | 0.1 |
| AO Stabilizer 2 | % | 0.06 | 0.06 |
| Stabilizer 3 | % | 0.09 | 0.09 |
| Flame Retardant | % | 0.03 | 0.03 |
| PETS (conventional) | % | 0.3 |  |
| V-PETS-1 (FACI) | % |  | 0.3 |
| Properties |  |  |  |
| Haze at 1 mm | % | 5.4 | 0.7 |
| Transmittance at 1 mm | % | 89.3 | 91.3 |
| Haze at 2 mm | % | 7 | 1.6 |
| Transmittance at 2 mm | % | 87.1 | 90.8 |
| MFR, 300° C., 2.16 kg | cc/10 min | 30 | 31 |
| Flexural modulus | MPa | 2370 | 2370 |
| Flexural strength at break | MPa | 93 | 93 |
| HDT, 0.45 MPa, 3.2 mm | ° C. | 133 | 134 |
| HDT, 1.82 MPa, 3.2 mm | ° C. | 121 | 122 |
| Notched Izod Impact, 23° C. | J/m | 821 | 792 |

As shown in Table 6, ITR-PC compositions including a vegetable-based PETS according to aspects of the disclosure had improved optical properties as compared to the comparative composition including animal-based PETS (compare C3 to Ex7-Ex9). The example compositions had lower haze and higher transmittance at multiple thicknesses (1 mm and 2 mm) as compared to the comparative composition. As shown in Table 7, similar results were observed with a composition including ITR-PC and PC homopolymer (compare comparative composition C4 to example composition Ex10).

From the data it is seen that thermoplastic compositions including vegetable-based PETS as a mold release agent provide the compositions with improved optical performance as compared to compositions including animal-based PETS. Such compositions may thus be especially suited for transparent application such as lenses, window glass, automobile headlight covers and lamp covers.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:
a thermoplastic resin comprising a polycarbonate copolymer comprising a polyester-polycarbonate copolymer, an isophthalate-terephthalate-resorcinol (ITR)-polycarbonate copolymer, or a combination thereof;
from about 0.1 wt % to about 0.3 wt % of a mold release agent comprising a pentaerythritol tetrastearate derived from an aliphatic carboxylic acid having less than 50 wt % content of C18 or longer alkane chains; and
from 0.01 wt % to about 5 wt % of a stabilizer component,
wherein the composition
  (1) has a haze that is at least 15% lower than that of a comparative composition that includes pentaerythritol tetrastearate derived form an animal source instead of the mold release agent derived from an aliphatic carboxylic acid having less than 50 wt % content of C18 or longer alkane chains, or
  (2) has a notched Izod impact strength (NII) that is at least 15% higher than that of a comparative composition that includes pentaerythritol tetrastearate derived from an animal source instead of the mold release agent derived from an aliphatic carboxylic acid having less than 50 wt % content of C18 or longer alkane chains, wherein NII is determined according to ASTM D256 and ASTM D4812 at 23° C. with a pendulum energy of 5 pound-force per foot (lbf/ft), and
wherein the combined weight percent value of all components does not exceed 100 wt %, and all weight percent values are based on the total weight of the composition.

2. The thermoplastic composition according to claim 1, wherein the mold release agent is derived from a plant or vegetable source.

3. The thermoplastic composition according to claim 1, wherein the composition comprises an ITR-polycarbonate copolymer comprising from 10-90 wt % ITR blocks and from 10-90 wt % polycarbonate blocks.

4. The thermoplastic composition according to claim 1, wherein the stabilizer component comprises a thermal stabilizer, a hydro stabilizer, a UV stabilizer, or a combination thereof.

5. The thermoplastic composition according to claim 1, wherein the composition further comprises at least one additional additive.

6. The thermoplastic composition according to claim 5, wherein the at least one additional additive comprises an acid scavenger, an anti-drip agent, an antioxidant, an anti-static agent, a chain extender, a colorant, a flow promoter, a lubricant, a plasticizer, a quenching agent, a flame retardant, a UV reflecting additive, an impact modifier, a blowing agent, a reinforcing agent, or a combination thereof.

7. The thermoplastic composition according to claim 5, wherein the composition comprises from greater than 0 wt % to about 5 wt % of at the least one additional additive.

8. The thermoplastic composition according to claim 5, wherein the composition comprises from greater than 0 wt % to about 10 wt % of a reinforcing agent comprising glass fiber.

9. The thermoplastic composition according to claim 1, wherein the composition has a haze of less than 3.5% as tested in accordance with ASTM D2244 with a 10° observer and a D65 illuminant.

10. An article comprising the thermoplastic composition according to claim 1.

11. The article according to claim 10, wherein the article comprises one or more of a lens, window, automobile headlight cover, and lamp cover.

* * * * *